US008770584B1

(12) United States Patent
Miravete

(10) Patent No.: US 8,770,584 B1
(45) Date of Patent: Jul. 8, 2014

(54) PICTURE GAME

(76) Inventor: Paul Miravete, Henderson, NV (US)

( * ) Notice: Subject to any disclaimer, the term of this patent is extended or adjusted under 35 U.S.C. 154(b) by 905 days.

(21) Appl. No.: 11/755,626

(22) Filed: May 30, 2007

Related U.S. Application Data

(60) Provisional application No. 60/803,563, filed on May 31, 2006.

(51) Int. Cl.
*A63F 1/02* (2006.01)

(52) U.S. Cl.
USPC .......................... 273/237; 273/308; 434/428

(58) Field of Classification Search
USPC .......................... 273/273, 237, 454; 434/428
See application file for complete search history.

(56) References Cited

U.S. PATENT DOCUMENTS

| | | | | |
|---|---|---|---|---|
| 5,478,084 A | * | 12/1995 | Itkis | 273/239 |
| 5,743,740 A | * | 4/1998 | Visser et al. | 434/128 |
| 5,791,991 A | * | 8/1998 | Small | 463/41 |
| 6,565,091 B2 | * | 5/2003 | Weingardt | 273/269 |
| 6,669,486 B2 | * | 12/2003 | Frankenbery et al. | 434/404 |
| 7,019,871 B2 | * | 3/2006 | Risheq | 358/474 |
| 7,128,320 B2 | * | 10/2006 | Yamaguchi et al. | 273/269 |
| 2002/0082082 A1 | * | 6/2002 | Stamper et al. | 463/32 |
| 2005/0098950 A1 | * | 5/2005 | Yamaguchi et al. | 273/269 |

* cited by examiner

*Primary Examiner* — Vishu K. Mendiratta
(74) *Attorney, Agent, or Firm* — Rob L. Phillips; Greenberg Traurig, LLP

(57) ABSTRACT

Described is a picture game which utilized bingo-style game cards having images depicted thereon. As random images and photos are selected and displayed, matching images on the game cards are identified until one or more players hold a game card having a pre-established pattern marked. During the display of images and photos, messages, including advertisements or trivia questions, may be displayed as well. In another version, the game may also be used to facilitate memory exercises.

25 Claims, 5 Drawing Sheets

PICTURE GAME

CROSS-REFERENCE TO RELATED APPLICATION

This application claims the benefit of U.S. Provisional Application No. 60/803,563 filed May 31, 2006, which is incorporated herein by reference in its entirety for all purposes.

FIELD OF THE INVENTION

The embodiments of the present invention relate to games, more specifically, to a picture game modeled after bingo.

BACKGROUND

People enjoy taking pictures and sharing them with friends and family. With the advent of digital cameras and camera phones, sharing pictures has never been easier. However, not everyone enjoys sitting down in front of a computer, television or monitor to view these pictures or photographs. Furthermore, it becomes a challenge when there are four or five people wanting to view the photographs at the same time. Indeed, the only practical way to do so is to take turns in front of the computer, television or monitor.

Thus, there exists a need for a method in the form of a game that makes it easy to share pictures with friends and family and also makes the process more enjoyable. Furthermore, the game may incorporate trivia questions and be adapted as a training tool or for memory exercises.

SUMMARY

Accordingly, a first embodiment of the present invention comprises: display means operable to display one or more images from a group of images intermixed with one or more photos from a group of photos in a random order; and a plurality of game cards having a pre-determined matrix pattern including a plurality of images matching those in the group of images, said game cards able to be marked during the game to identify the display of images matching those images on the game cards, and wherein a winner is determined by a player marking the card to form a pre-established pattern, e.g., five across, five up/down or five diagonal.

The display may comprise a computer monitor, television screen, aircraft cabin passenger entertainment system, monitor or other device. The photos can come from photographs taken by digital cameras, video cameras and digitized pictures from books, newspapers, magazines, other printed materials, works of art and artistic renditions. The images can belong to various categories such as animals, people, things, numbers and themes. Preferably, the game card is constructed with a metal, plastic or paper substrate. In other embodiments, one or more messages may be intermittently interposed within the series of images and photos being displayed. The messages may include advertisements and trivia questions. The picture game can also be adapted to facilitate memory exercises.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
FIG. 1 illustrates a plurality of pictures that can be used in a picture game in accordance with the presently disclosed invention.
Figure 2:
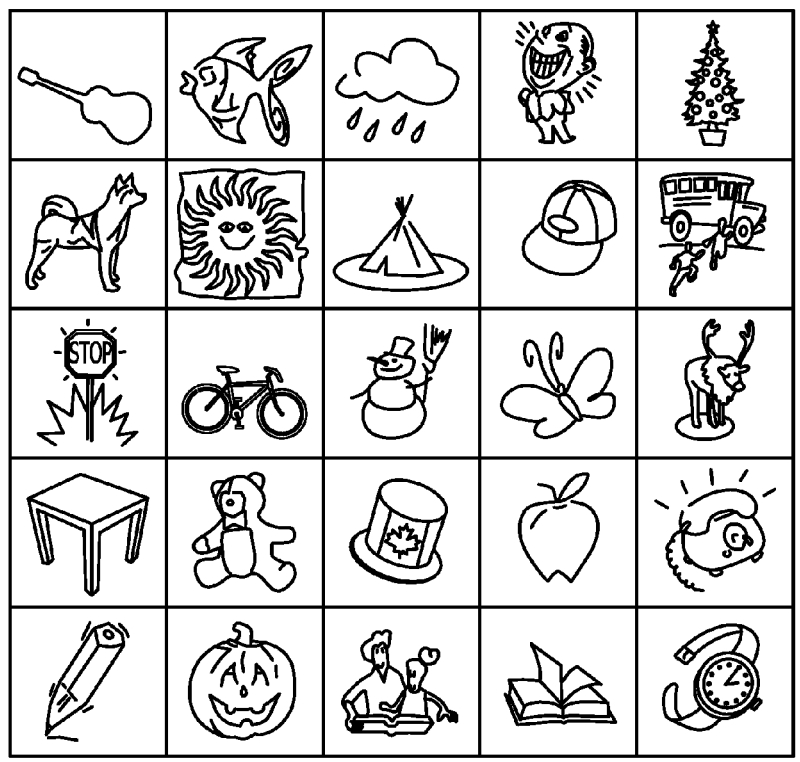
FIG. 2 illustrates a 5×5 matrix picture bingo-style card including a plurality of images.

Initial reference is made to FIG. 1 illustrating a plurality of images 10. In one embodiment, the images 10 are printed on a suitable medium, individually removed and randomly mixed to construct a bingo-style card 12 as illustrated in FIG. 2. In another embodiment, the bingo-style cards 12 are pre-printed and packaged in a game box. For example, a game box may come with three or four pads of unique bingo-style cards 12 to allow for different games to be played. Although a 5×5 matrix bingo-style card 12 is shown, it is understood that any matrix (e.g. 3×3, 4×4, 3×5) can be created or provided. Along with the bingo-style cards 12, a game box also includes one or more memory devices (e.g., DVDs, memory cards, etc.) (not shown) for downloading digital images corresponding to the images 10 on the bingo-style cards 12. The digital images may be downloaded to a computer, television or any suitable device having a display. The game box also includes randomization software for facilitating game play.

The bingo-style card 12 can be constructed with a metal, plastic or paper substrate. With a metal substrate, the images 10 may be printed directly on magnetically sensitive material to facilitate connection of the images 10 to the metal bingo-style card. In the alternative, the images 10 can be printed on paper, attached to magnetically sensitive materials using known methods and coupled to the metal substrate. With a plastic or paper cardboard substrate, the pictures 10 can be printed directly on a plastic medium or on a paper medium and adhered to the plastic or paper cardboard substrate using known fastening means such as glue or tape. The bingo-style cards 12 may also be pre-printed in pad form. Multiple bingo-style cards 12 can be constructed using a plurality of images 10 being randomly distributed within the matrix such that no two bingo-style cards 12 have identical image 10 patterns.

Once the bingo-style cards 12 have been created or provided, home pictures or photos 11 are selected and downloaded for use with the game. The photos 11 used with the game may be taken with a cellular telephone equipped with a camera, digital camera, video camera or other electronic means. Ideally, the photos 11 are digitized and can be uploaded in electronic formats onto devices such as computers and laptops. The photos 11 can also be uploaded onto the Internet. The photos 11 should be displayable on computers, televisions, monitors and other entertainment hardware/software systems. Photos 11 that are not digitized can be digitized and uploaded using known methods such as a scanner linked to a computer. Therefore, old family photos 11 that were developed on film can be scanned and used to play the picture game. The home photos 11 can be of any desired nature and do not need to relate to the images 10. Once the images 10 and home photos 11 are downloaded onto an appropriate device having a display, the picture game can commence with one or more players.

Figure 3:
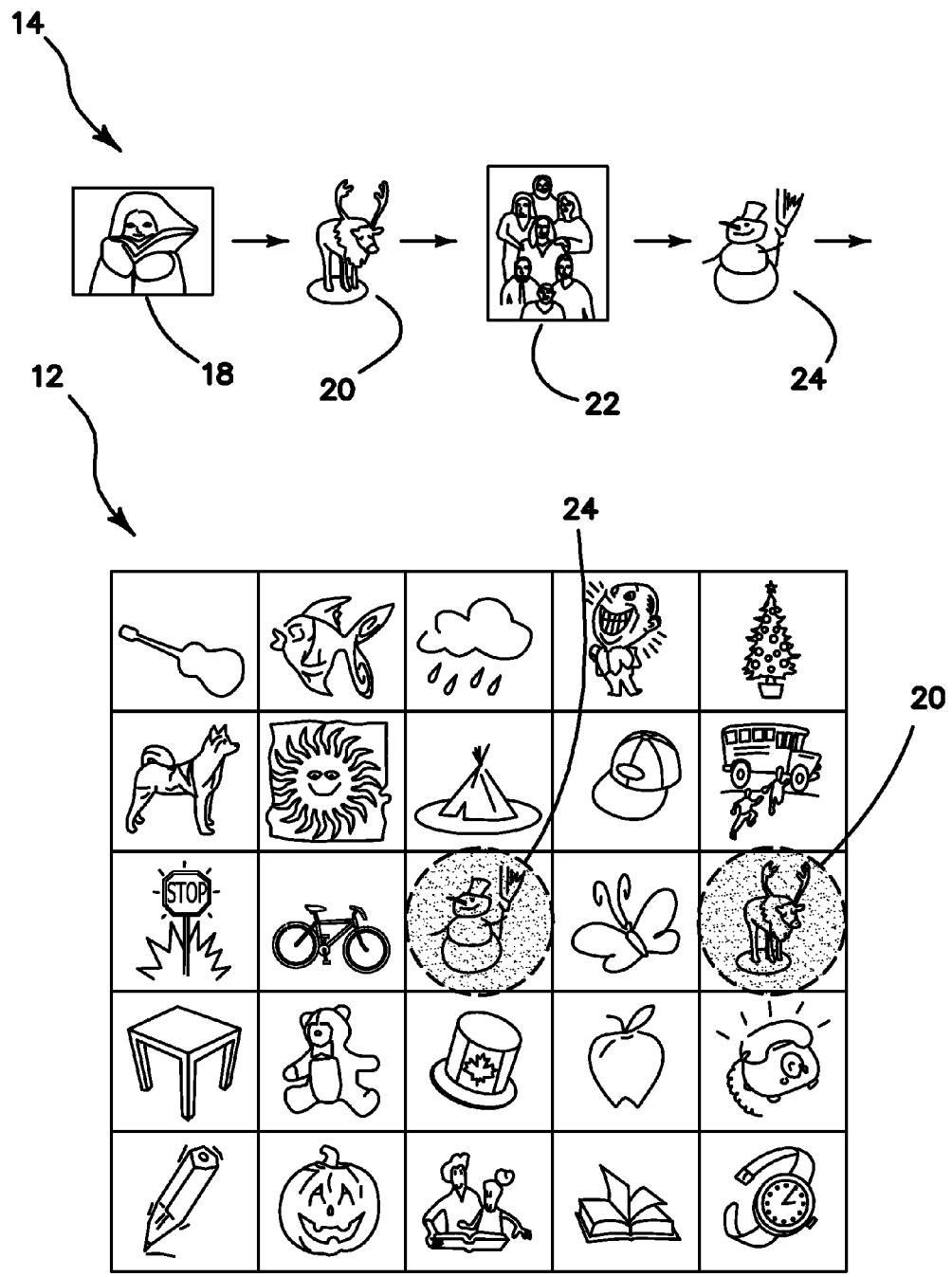
FIG. 3 illustrates a first method of playing the picture game using a plurality of images, photos, and a bingo-style card.

Reference is now made to FIG. 3 illustrating a method of playing a picture game using a plurality of images 10, photos 11 and the bingo-style cards 12. Ideally, each player has at least one bingo-style card 12. Players can also choose to play multiple bingo-style cards 12 simultaneously. In one embodiment, the game is played with specific themes. In other words, the bingo-style cards 12 may be limited to images 10 of animals (including their foot tracks), picture frames or numbers only. In other instances, the bingo-style cards 12 may have mixed categories or themes. In another embodiment, there may be a limited variations of images 10 on the bingo-style cards 12 to limit the amount of time required to play the picture game. For example, the bingo-style cards 12 may be limited to eight different images 10 of animals or six different images 10 of people.

Once the images 10 and photos 11 have been digitized or made available electronically, they can be subjected to a randomization software algorithm whereby the images 10 and photos 11 are randomly displayed on a computer, television or monitor. In one embodiment, random images 10 and photos 11 are sequentially displayed one after the other. For example, first a photo 11 is shown for a pre-established amount of time (e.g., 10-15 seconds) and then an image 10 is shown for a pre-established amount of time (e.g., 5-10 seconds) and this is repeated with random images 10 and photos 11. Once an image 10 is displayed, each player views their one or more bingo-style cards 12 to determine if there is a match between the image 10 being displayed on the screen and the images on his or her bingo-style card 12. If there is a match, the player marks or highlights it on his or her bingo-style card 12. If the bingo-style card 12 is metallic, magnetic markers may be used to highlight the matching image 10. If the bingo-style card 12 is plastic or paper, suitable markers (e.g., daubers) may be used to highlight the matching images 10.

An illustration of the process as described above is shown in FIG. 3, in which a series 14 of images 10 and photos 11 are intermittently displayed to a player holding a bingo-style card 12. Initially, a photo 18 of a girl in a swimming pool is shown, followed by an image of a moose 20, which yields a match. The player can highlight or indicate the match with a marker or other marking means as described above and shown in FIG. 3. A subsequent photo 22 of a family portrait is shown, followed by an image of a snowman 24, which also yields a match. Again, the player can highlight or indicate the match with a marker or other marking means as described above and shown in the figure. If there is no match, the player does nothing. The display and match process continues until at least one player has matched five pictures 10 in a row, column or diagonal (or some other pre-established pattern) for a 5×5 matrix bingo-style card 12. Other matrix sizes may be used. As suggested above, in one embodiment, the photos 18, 22 are displayed for 10-15 seconds while the images 20, 24 are displayed for 5-10 seconds. Any suitable display times are possible.

Intermixing the images 10 and photos 11 in the manner described above allows players to enjoy the home photos 11 while participating in a competitive game simultaneously. The game facilitates viewer ship of home photos 11 bringing the viewers closer together.

Figure 4:
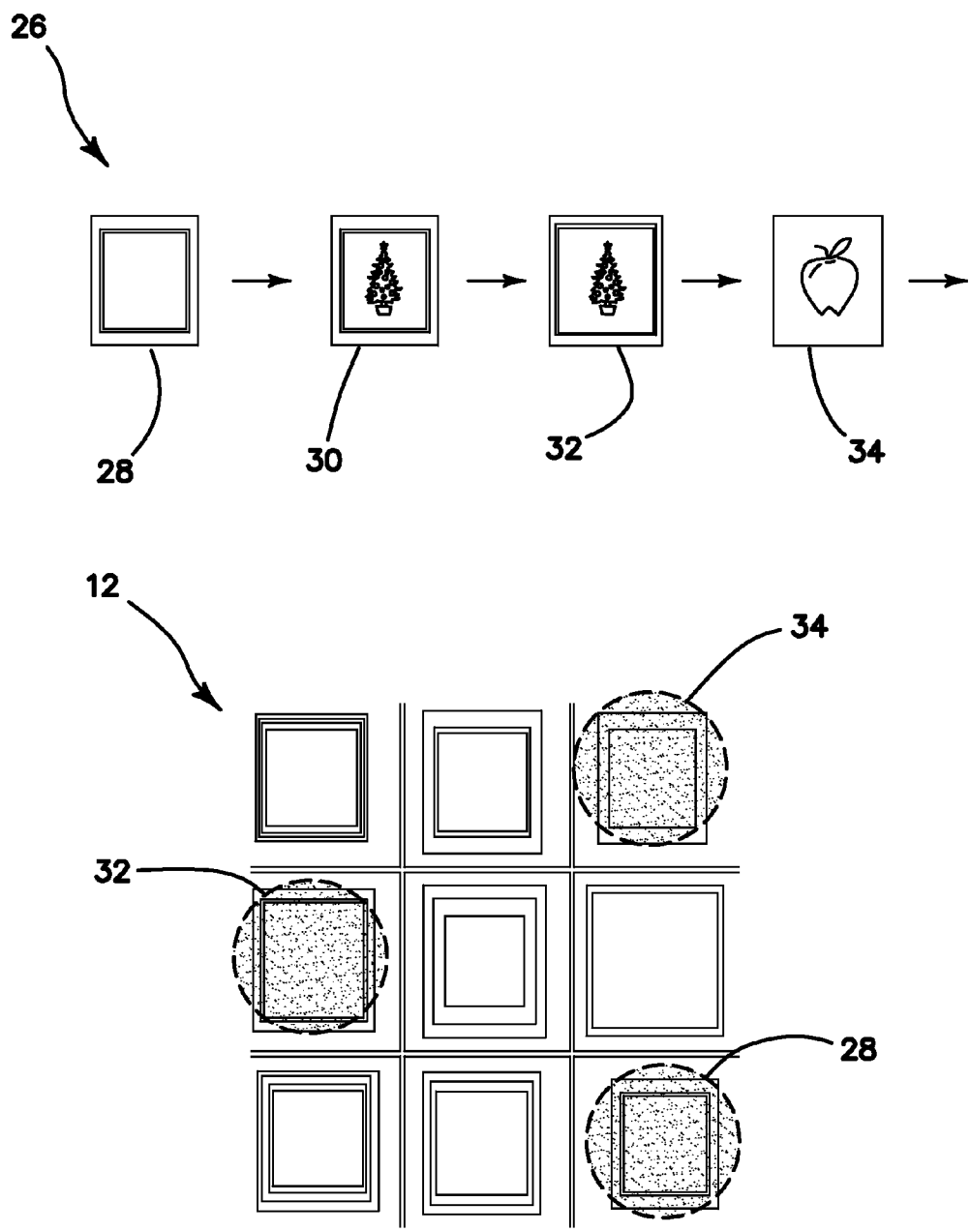
FIG. 4 illustrates a second method of playing the picture game using a plurality of images, picture frames and a bingo-style card.

In another embodiment, the bingo-style card 12 is constructed of a plurality of picture frames as illustrated in FIG. 4. Ideally, the picture frames do not contain a picture so that various images 10 and photos 11 may be projected within the picture frame in manner as detailed above. As the series 26 of picture frames is being scrolled through, the picture frame can remain static while interior images 10 and photos 11 are projected within the picture frame (as shown by step 28 to step 30). Alternatively, the interior images 10 and photos 11 can remain static while the picture frame changes (as shown by step 30 to step 32). Furthermore, the picture frame and the image 10 and photo 11 within the picture frame can both change simultaneously (as shown by step 32 to step 34). Like above, the game ends when the player has matched three picture frames in a row, column or diagonal of a 3×3 matrix bingo-style card 12. As shown in FIG. 4, only three picture frames have been matched 28, 32, 34 and they do not form a row, column or diagonal, so the bingo-style card is not a winner yet.

In other embodiments of the present invention, instead of images 10 being displayed intermittently with the photos 11, trivia questions and training materials are used. Like above, the trivia questions or training materials may be shown in place of the images 10 but intermixed with the photos 11. Doing so not only allows players to actively participate in the picture game thereby making it exciting and entertaining, it also makes for honing one's mental faculty and exposing people to training applications. The game can be played in a method similar to that previously described.

Additionally, the game can include static advertising displayed within the series of displayed images 10 and photos 11. Doing so not only allows extra revenue to be generated from the selling of advertising space for games played in a bingo hall, public venue or online, but also increases the likelihood that players will be focused on the advertising because the players do not want to miss subsequent images 10 displayed within the series 14, 26.

Figure 5:
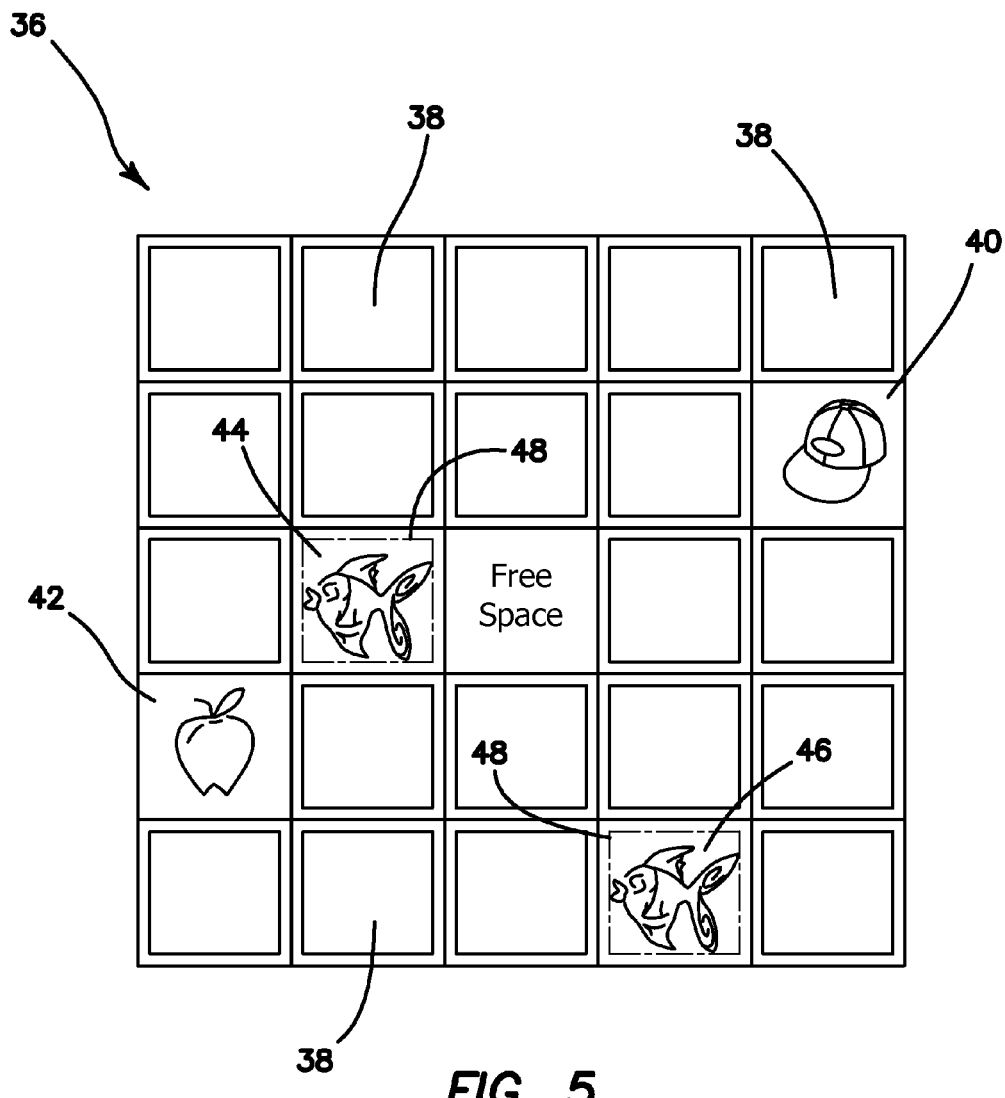
FIG. 5 illustrates a third method of playing a picture memory exercise game.

In yet another embodiment, the picture game can be adapted for memory exercises. In this instance, no bingo-style cards 12 are necessary as the game is played on an electronic display such as a computer monitor or television screen. Reference is now made to FIG. 5 illustrating a picture memory exercise game 36 having a 5×5 matrix. Underneath each individual box 38 is a picture 10 that is initially concealed 38. Players take turns selecting a pair of covered boxes 38 in hopes of matching the pictures underneath. The selections can be made by touching the screen, using a keyboard, mouse, remote control or other external devices. If there is no match as shown by the player turning over a cap 40 and an apple 42, then the boxes revert back to being covered 38 and the next player gets to make his or her selection. The player that fails to make a match needs to remember which picture 10 was displayed and in which box 38 in order to improve his or her chance of making a match during subsequent selections. The game 36 can be played where the player making the selection is the only one that can look at the screen. Alternatively, the game 36 can also be played whereby all the players are able to view the selections made by each and every player. Doing so allows everyone to exercise their own memory power in trying to remember where the pictures 10 are located. The player that matches a pair of pictures 10, as illustrated by the selection of a pair of fish 44, 46, is accordingly credited with the match by having the boxes outlined 48 to correspond with the player that made the match. Other highlighting or coloring schemes can also be employed to ensure that credit is properly provided. The pictures 10 that have been matched 44, 46 remain exposed until the game 36 ends. The player having the most highlights 48 at the end of the game 36, after all the pictures 10 have been revealed, wins the game 36. And like above, although a 5×5 matrix is illustrated, it is understood that the game 36 can be played using any sized matrix. In addition, the boxes 38 could be displayed as bubbles that move freely about the screen without overlapping each other or relocating position. By having the boxes 38 or bubbles move about a general area adds to the memory challenge.

The bingo-style card games described herein can be adapted for play in a gaming hall, other public venues or on the Internet with the bingo-style cards 12 being electronically generated. In other instances, the picture game may be played using a picture board (not shown) instead of bingo-style card 12, the picture board game being physically or electronically generated.

The embodiments as described above allow friends and families to view and share pictures and make the process more pleasant and enjoyable by playing a game that adults and children will enjoy. And even though the game can be enjoyed at home, it is understood that the picture game can be played on trips using a laptop computer, monitor, iPhone, electronic device, and even on airplane flights via an airline's in-flight entertainment system.

Although the invention has been described in detail with reference to several embodiments, additional variations and modifications exist within the scope and spirit of the invention as described and defined in the following claims.

I claim:

1. A picture game comprising:
   a software application configured to intermix one or more digital personal photos of an individual having access to said one or more digital personal photos with a group of digital game images, wherein said one or more digital personal photos are made available to the software application by actions of the individual having access to said one or more digital personal photos, said digital personal photos not included with the picture game, and wherein said digital game images are prepackaged with the software application;
   display means operable to display one or more digital game images from said group of digital game images intermixed with one or more of said digital personal photos in a random successive order such that only one digital game image or digital personal photo is displayed at a given time; and
   a plurality of game cards having a pre-determined matrix pattern including a plurality of game images matching those in the group of digital game images, said game cards configured for marking during the game to identify the display of digital game images matching those game images on the game cards, and wherein a winner is determined by a first player marking the game card to form a pre-established pattern.

2. The game of claim 1, wherein the display means includes computer monitors and television screens.

3. The game of claim 1, wherein the photos are taken by digital cameras or video cameras.

4. The game of claim 1, wherein the images belong to various categories including animals, people, things, places, activities, numbers, themes and picture frames.

5. The game of claim 1, wherein the game card is constructed with a metallic metal, plastic or paper substrate.

6. The game of claim 1, further comprising one or more messages intermittently interposed within the series of images and photos being displayed.

7. The game of claim 6, wherein the messages include advertisements and trivia questions.

8. A method for playing an electronic picture game comprising:
   providing game cards having a matrix of game images pre-printed thereon, each of said game cards having a unique pattern of game images;
   accepting electronically one or more digital personal photos made available by an individual having access to said one or more digital personal photos;
   electronically intermixing said one or more digital personal photos with a group of digital game images matching the game images on the game cards;
   displaying intermittently one or more digital game images from said group of digital game images with one or more of said digital personal photos in a random order such that only one digital game image or digital personal photo is displayed at a given time and whereby players mark the game cards to identify displayed digital game images matching game images on the game cards wherein a winner is a first player to mark a game card in a pre-established pattern.

9. The method of claim 8, further comprising utilizing display means comprising a computer monitor, television screen, electronic phone device or airplane passenger entertainment system.

10. The method of claim 8, further comprising photos taken by digital cameras or video cameras.

11. The method of claim 8, wherein the game card is constructed with a metallic metal, plastic or paper substrate.

12. The method of claim 8, further comprising displaying one or more messages intermittently within the display of the images and photos.

13. The method of claim 12, further comprising displaying messages including advertisements and trivia questions.

14. The method of claim 8 wherein images and photos are shown sequentially, one after the other, until a winner is declared.

15. The method of claim 8 wherein the game card pattern is a matrix.

16. A method for playing an electronic picture game comprising:
   generating a plurality of game cards having pre-determined patterns formed of a plurality of game images;
   accepting electronically one or more digital personal photos made available by an individual having access to a group of digital personal photos;
   electronically intermixing one or more of said digital personal photos with a group of digital game images matching the game images on the game cards;
   utilizing display means to display intermittently one or more digital game images from said group of digital game images and one or more of said digital personal photos in a random order such that only one digital game image or digital personal photo is displayed at a given time, said group of digital game images matching those used to generate the game cards;
   providing to players a plurality of game cards for players to select from, said game cards configured for marking during the game to identify the display of digital game images matching the game images on the game card; and
   deeming a winner the first player to mark the game card to form a pre-established pattern.

17. The method of claim 16, further comprising utilizing display means comprising a computer monitor or television screen.

18. The method of claim 16, further comprising displaying photos taken by digital cameras or video cameras.

19. The method of claim 16, wherein the game card is constructed with a metallic metal, plastic or paper substrate.

20. The method of claim 16, further comprising displaying one or more messages intermittently within the display of the images and photos.

21. The method of claim 20, further comprising displaying messages including advertisements and trivia questions.

22. The method of claim 16 wherein the game card pattern is a matrix.

23. A game kit comprising:
pre-printed game cards depicting a pattern of game images;
a memory device storing digital game images, corresponding to the game images depicted on the game cards;
means for receiving one or more digital personal photos made available by an individual having access to said one or more digital personal photos; and
a randomization game software application adapted to cause the stored digital game images and one or more of said digital personal photos to be displayed on a display intermittently with one another in a random manner such that only one digital game photo or digital personal photo is displayed at a given time to facilitate game play utilizing said pre-printed game cards.

24. The game kit of claim 23 further comprising one or more daubers for marking the game cards.

25. The game kit of claim 23 wherein the pre-printed game cards are metallic allowing magnetic markers to be used.

* * * * *